United States Patent [19]

Brock et al.

[11] Patent Number: 5,291,493
[45] Date of Patent: Mar. 1, 1994

[54] ISDN INTERFACE

[75] Inventors: James R. Brock, Bedminster; Steven M. Gelfond, Parsippany-Troy Hills, both of N.J.

[73] Assignee: AT&T Bell Laboratories, Murray Hill, N.J.

[21] Appl. No.: 892,084

[22] Filed: Jun. 2, 1992

[51] Int. Cl.$^5$ .............................................. H04J 3/02
[52] U.S. Cl. ................................ 370/110.1; 370/99
[58] Field of Search ............... 370/110.1, 95.1, 85.7, 370/99, 94.1, 60

[56] References Cited

U.S. PATENT DOCUMENTS 4,797,644 12/1988 Philip et al. .
4,873,682 10/1989 Irwin et al. .
4,970,723 11/1990 Lin .................... 370/110.1
4,987,570 1/1991 Almond et al. ............... 370/99
4,998,243 3/1991 Kao .................... 370/110.1
5,018,141 5/1991 Kim .................... 370/110.1

Primary Examiner—Douglas W. Olms
Assistant Examiner—Min Jung
Attorney, Agent, or Firm—Lester H. Birnbaum

[57] ABSTRACT

Disclosed is a method and apparatus for transferring data in an Integrated Services Digital Network (ISDN) system. Certain system information bits are displaced into time slot zero to permit the transmission of the B2 channel bits in the same assigned time slots as the B1 channel. D channel bits are also assigned to unused time slots.

17 Claims, 6 Drawing Sheets

FIG. 2
(PRIOR ART)

| $b_0 \rightarrow b_7$ | $b_8$ | $b_9$ | $b_{10}$ | $b_{11}$ | $b_{12}$ | $b_{13}$ | $b_{14}$ | $b_{15}$ |
|---|---|---|---|---|---|---|---|---|
| VOICE/DATA BITS | $S_1$ | $S_2$ | $S_3$ | $S_4$ | $S_5$ | $S_6$ | $S_7$ | P |

FIG. 3

| $b_0 \rightarrow b_7$ | $b_8 \rightarrow b_{15}$ |
|---|---|
| B1 | B2 |

FIG. 4

| $b_0$ | $b_1$ | $b_2$ | $b_3$ | $b_4$ | $b_5$ | $b_6$ | $b_7$ | $b_8$ | $b_9$ | $b_{10}$ | $b_{11}$ | $b_{12}$ | $b_{13}$ | $b_{14}$ | $b_{15}$ |
|---|---|---|---|---|---|---|---|---|---|---|---|---|---|---|---|
| $A_4$ | $A_3$ | $A_2$ | $A_1$ | $A_0$ | H | L | $E_{B1}$ | $G_{B1}$ | $E_{B2}$ | $G_{B2}$ | PD | $M_2$ | $M_1$ | $M_0$ | P |

ABSTRACT

ISDN INTERFACE

BACKGROUND OF THE INVENTION

This invention relates to Integrated Services Digital Networks (ISDN).

ISDN systems were developed to permit transfer of voice, data, and video information to each customer. The systems comprise three channels per customer designated the B1, B2, and D channels. The B1 and B2 channels each include 8 bits, while the D channel comprises 2 bits. A typical digital loop carrier transmission system, such as the Subscriber Loop Carrier (SLC®) system, generally transmits data within a remote terminal (RT) in a frame having 32 time slots of 16 bits each, with each time slot broken into 8 bits for voice/data and 8 bits for system information. A problem exists, therefore, in how to fit the 18 bits required in ISDN for each customer into the frame pattern of the standard carrier system. The usual approach now is to use three time slots for each customer with the B1, B2 and D channels, each occupying a different time slot. This solution, while generally workable, obviously wastes the true capacity of the system.

It has recently been suggested in telecommunications systems that the first time slot in each frame (time slot zero) be used to include bits from other time slots (see, e.g., U.S. Pat. No. 4,794,644 issued to Philip et al. and U.S. Pat. No. 4,873,682 issued to Irwin et al.).

It is, therefore, an object of the invention to utilize otherwise unused time slots, such as time slot zero, to create a data format which will tend to maximize the handling capacity of ISDN systems.

SUMMARY OF THE INVENTION

These and other objects are achieved in accordance with the invention which, in one aspect, is a method of transmitting data in an ISDN system which provides three channels per customer and uses a frame pattern including a plurality of time slots. Data from two of the channels are transmitted in a single time slot. Information concerning the system is transmitted in the first time slot in the frame. The data from the third channel is transmitted in an otherwise unused time slot.

In accordance with another aspect, the invention is an apparatus for transmitting data in an ISDN system which provides three channels per customer and which uses a frame pattern including a plurality of time slots. The apparatus includes means for placing the data from two of the channels in a single time slot. Means are also provided for placing the data from the third channel in an otherwise unused additional time slot.

BRIEF DESCRIPTION OF THE DRAWING

These and other features of the invention are delineated in detail in the following description. In the drawing:

FIG. 2 is a block diagram showing the placement of bits in a typical time slot in accordance with the prior art;

FIG. 3 is a block diagram showing the placement of bits in a typical time slot in accordance with an embodiment of the invention;

FIG. 4 is a block diagram illustrating the placement of bits in time slot zero in accordance with an embodiment of the invention;

DETAILED DESCRIPTION

Figure 1:
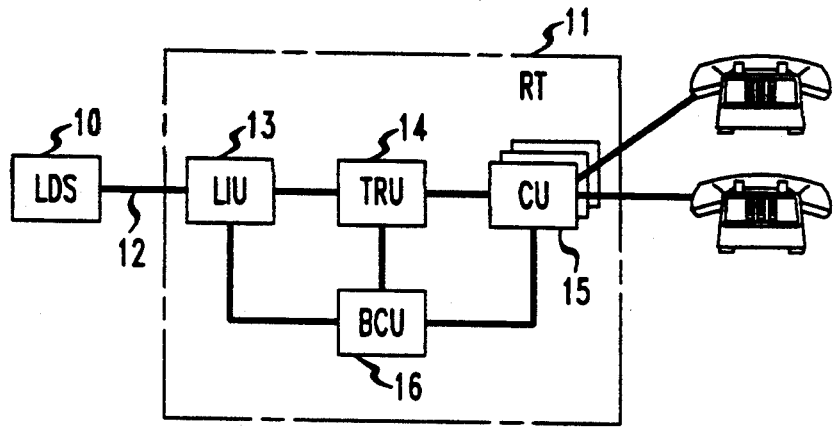
FIG. 1 is a block diagram of a typical digital loop carrier transmission system which can utilize the present invention.

FIG. 1 illustrates in block form some of the basic components of a digital loop carrier transmission system. Bidirectional digital transmission takes place between a local digital switch (LDS), 10, and a remote terminal (RT), 11, over link 12. A line interface unit (LIU), 13, converts the data frame pattern between what is compatible with the LDS and what is compatible with the transmit-receive unit (TRU), 14. The TRU demultiplexes the data coming from the LDS and, in the other direction, multiplexes data received from the channel units (CU), e.g., 15. The CUs serve as the interfaces to the customer and, among other functions, provide digital-to-analog and analog-to-digital conversion. Typically, one to four customer lines are coupled to each CU. The components of the remote terminal are controlled by a bank controller unit (BCU) 16. In some newer systems, such as SLC® 2000, the functions of the TRU and BCU are combined into a metallic distribution controller (MDC).

A typical frame transmitted between the TRU and CU comprises 32 time slots, some of which include data and some of which are unused. A typical time slot carrying data between a TRU and CU is illustrated in FIG. 2. It will be noted that the time slot includes 16 bits, labeled $b_0 \rightarrow b_{15}$. The first 8 bits in each time slot ($b_0 \rightarrow b_7$) consist of transmitted voice or data bits which could be from the B1, B2 or D channels. The remaining 8 bits ($b_8 \rightarrow b_{15}$) consist of system information bits ($S_1 \rightarrow S_7$) utilized to supervise or maintain the operation of the channel unit involved in the transmission and a parity bit (P).

FIG. 3 illustrates a typical used time slot in accordance with a feature of the invention. The first 8 bits again comprise transmitted voice or data, in this case the B1 channel information. However, the remaining 8 bits now include the B2 channel information rather than the system information. In accordance with a further feature of the invention, this displaced system information is inserted into time slot zero of the frame pattern, which is usually not used in data transmission. The information could also be inserted into other unused time slots, but the time slot zero is preferred since it is the easiest time slot for the remote terminal to decode.

FIG. 4 illustrates the bit pattern of a typical time slot zero in a frame pattern in accordance with one example of the invention. The first five bit positions ($b_0 \rightarrow b_4$) include the address bits $A_4 \rightarrow A_0$ which indicate the subscriber line for which this particular packet of information is intended. It will be appreciated that each frame of 32 time slots will typically be organized into a "superframe" of 24 frames. Consequently, each time slot zero of a frame in the superframe can be addressed to a different subscriber line at the remote terminal. The next bit position ($b_5$) is occupied by an "hour" bit, designated H, which is set (i.e., equal to "1") every hour and indicates the start of a new performance monitoring period. All CUs in the remote terminal receiving this will respond to this bit regardless of the address of the particular time slot zero. In fact, the H bit is usually set for at least two consecutive frames to be considered valid.

The next bit position, $b_6$, is occupied by the bit designated "L" which indicates that the master clock in the TRU is drifting out of its assigned range. This says to the CUs that their transceivers should be phase locked in their current state. Again, all CUs receiving this will respond to this bit being set regardless of the address. While the transceivers are locked, the CUs will recalculate jitter compensation to compensate for the drift.

Bit positions $b_7$ and $b_9$ include "E" bits, the subscripts B1 and B2 referring to the channels to which they pertain. These bits, when set (i.e., equal to 1), indicate that the associated channel (B1 or B2) for the particular CU unit has lost receive frame synchronization. Only the addressed CU responds to this information. Similarly, bit positions $b_8$ and $b_{10}$ include the "G" bits where, again, the subscripts refer to the B1 or B2 channels. These bits, when set, indicate loss of signal for the designated channels in the CU. Again, only the CU addressed in this particular time slot zero will respond. The "PD" bit in position $b_{11}$, when set, tells the addressed CU to power down its transceiver.

The next three bit positions, $b_{12} \rightarrow b_{14}$, are occupied by mode bits, designated $M_2$, $M_1$, $M_0$. A combination of these bits will tell the CU what digital loop carrier transmission system the CU is plugged into. For example, the system could be a Subscriber Loop Carrier (SLC®) Series 5 or 2000 system, or a Fiber-To-The-Home (FITH) system. Placement of the B1, B2 and D channels could vary depending upon the system employed. The final bit position, $b_{15}$, includes a parity bit (P).

The D channel bits (2 bits per customer line) are inserted into previously unused time slots other than time slot zero. For example, in present SLC® systems, these bits can be placed in time slots 4, 8, and 12, such that time slot 4 includes the D channels of customer lines 1 through 8, time slot 8 carries the D channels of lines 9–16, and time slot 12 carries the D channels of lines 17–24.

Figure 5:
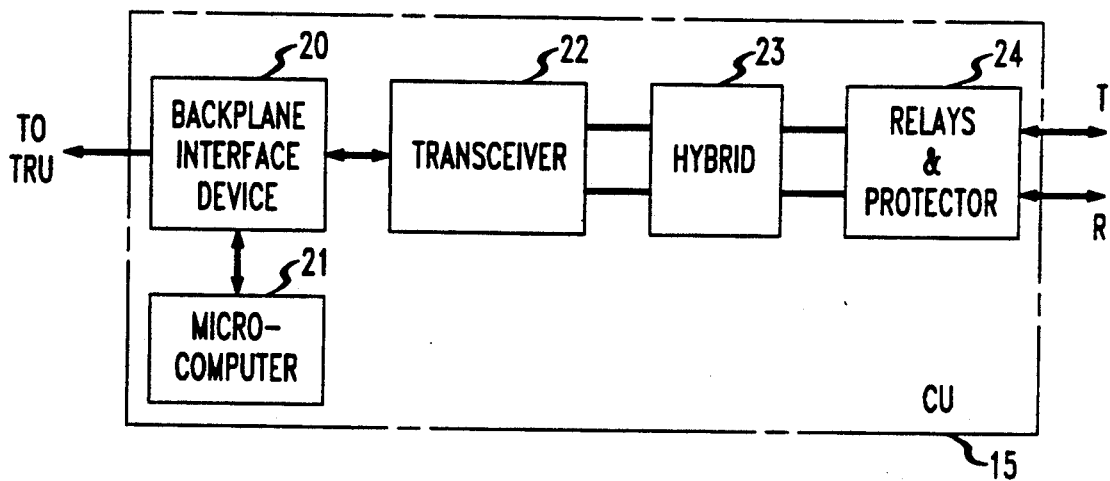
FIG. 5 is a block diagram illustrating portions of a typical channel unit which can utilize the invention.

FIG. 5 illustrates portions of a channel unit, 15, for implementing data transmission in accordance with the invention. Transmission between the CU and TRU (14 of FIG. 1) is handled by a backplane interface device, 20, discussed in more detail below. The interface device is controlled by a microcomputer, 21. The interface device is coupled to a transceiver, 22, for each customer line (only one line is illustrated for the sake of clarity). The transceiver can be a commercially-available part such as the T7264 SUBAT-II transceiver sold by AT&T. The transceiver, among other functions, performs analog/digital conversion, scrambling and echo canceling. The transceiver is coupled to a hybrid circuit, 23, which converts the four wire transmission to a two wire transmission for use by the customer. The hybrid is coupled through a series of relays and protection devices, 24, to the customer's tip (T) and ring (R) leads.

Figure 6:
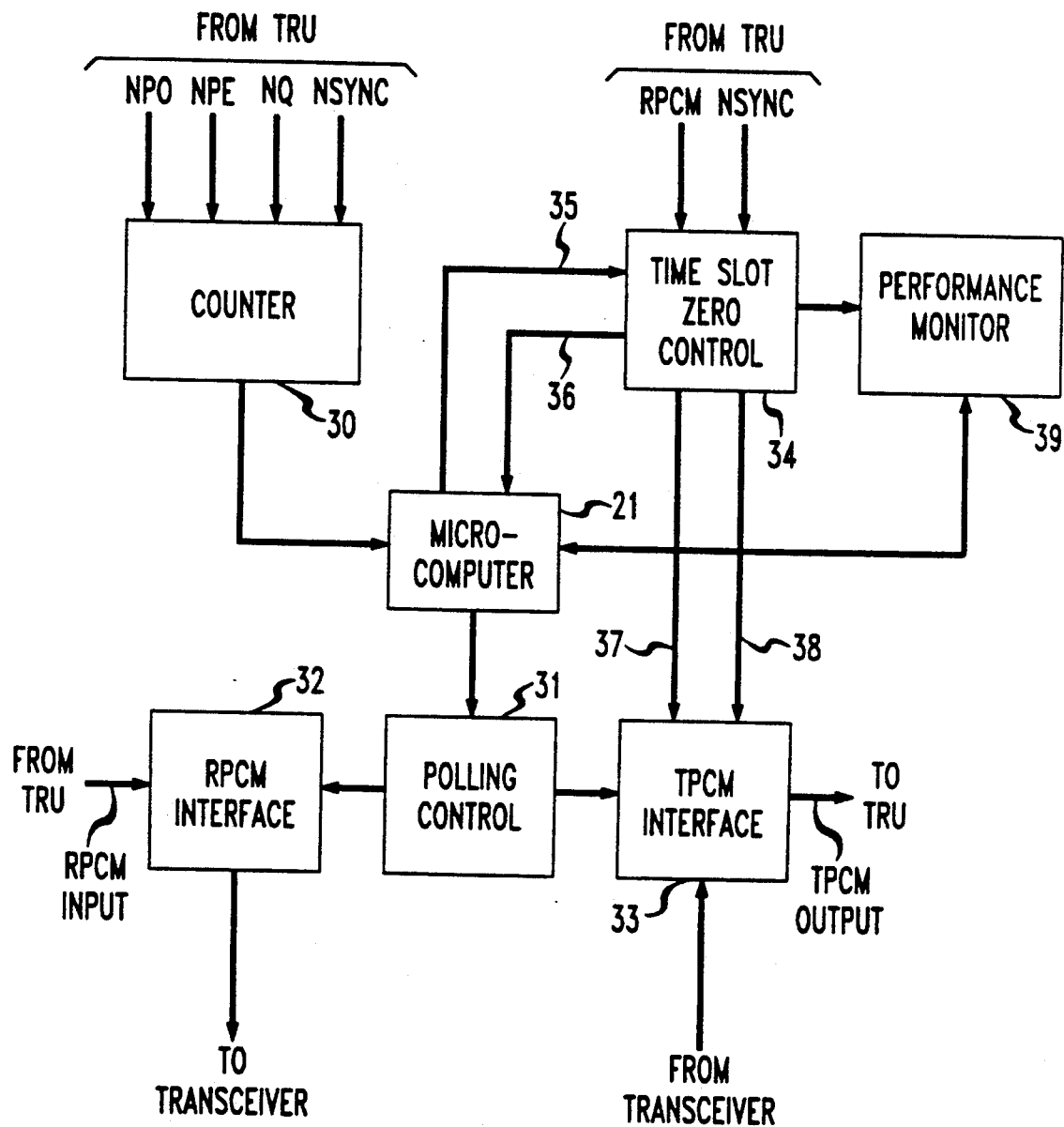
FIG. 6 is a block diagram illustrating further details of a portion of the channel unit of FIG. 5 in accordance with an embodiment of the invention.
Figure 7:
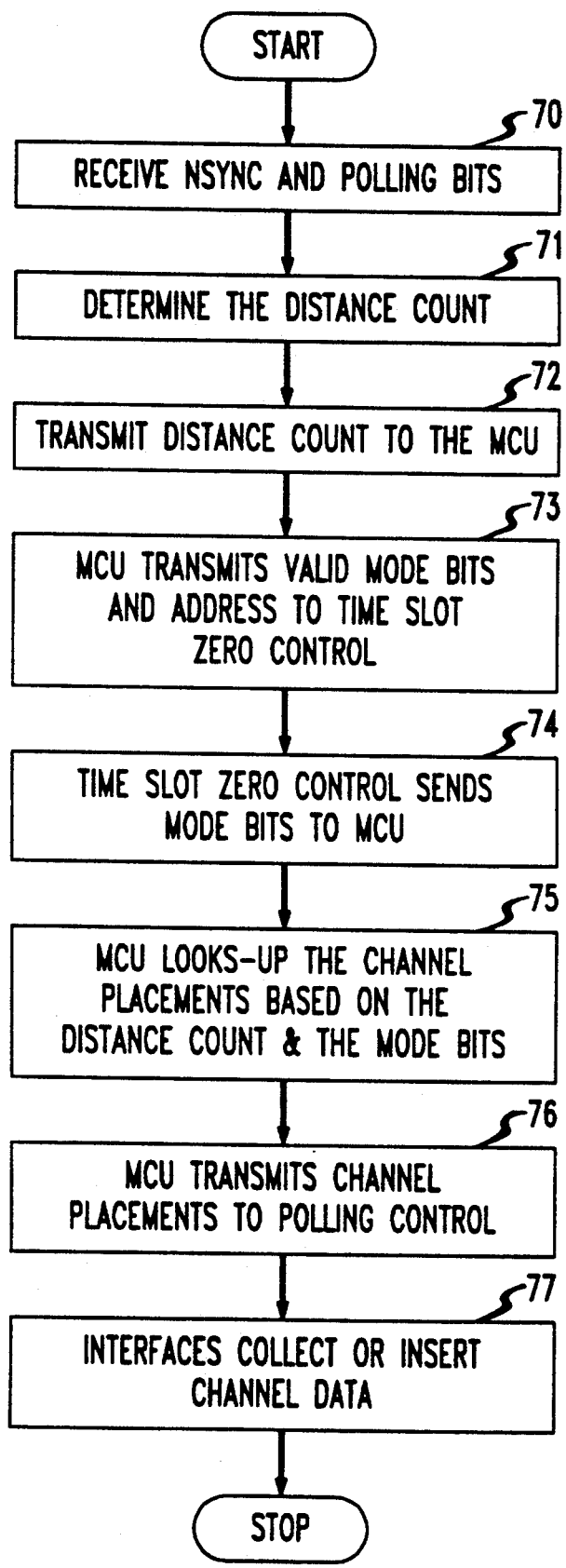
FIGS. 7 and 8 illustrate procedures for transmitting and receiving data in accordance with an embodiment of the invention.
Figure 8:
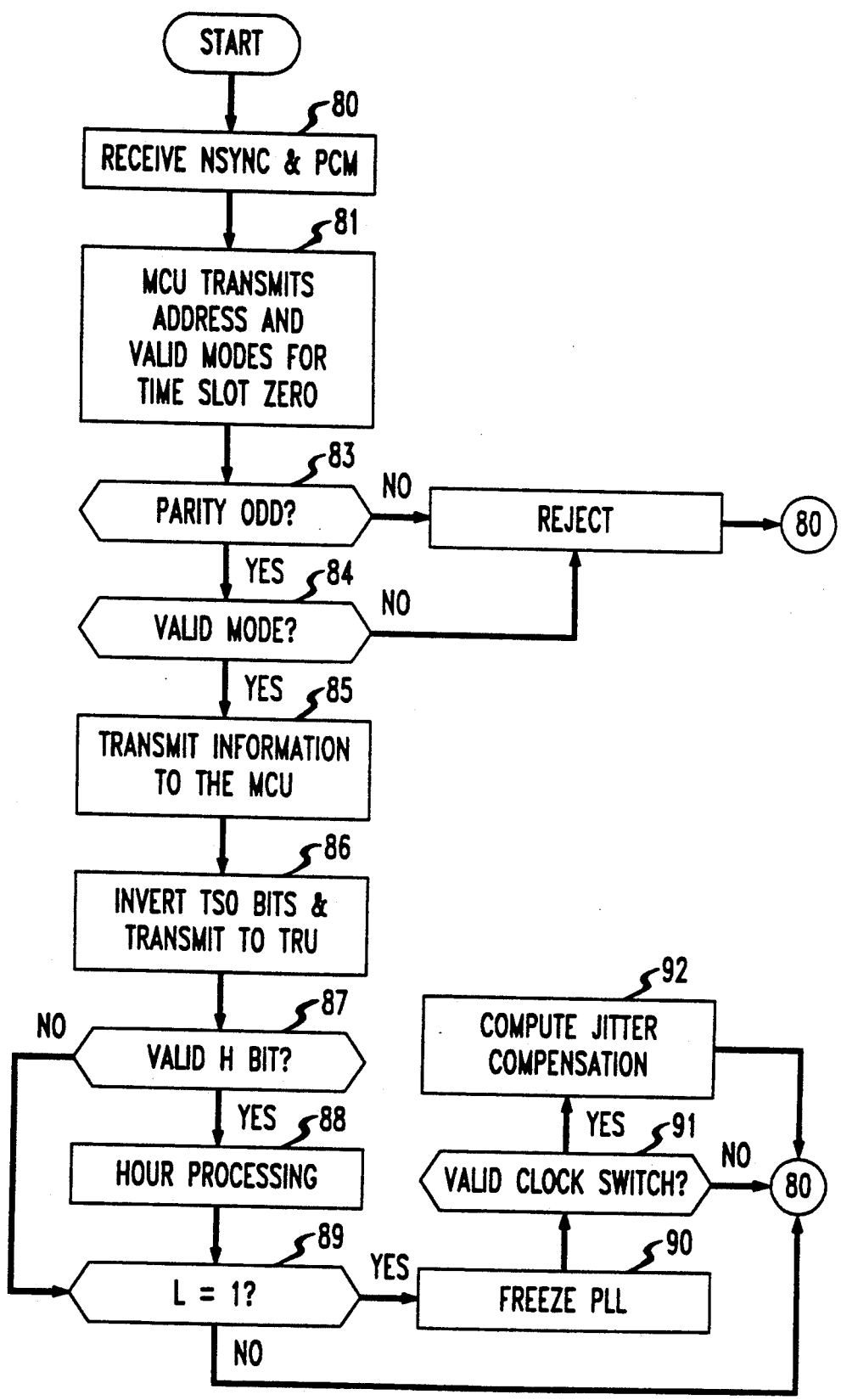

FIG. 6 illustrates additional detail in the backplane interface device of FIG. 5 while FIGS. 7 and 8 illustrate the operation of the circuitry. Leads designated NPO, NPE, NQ and NSYNC receive signals from the TRU as illustrated in step 70 and transmit them to a counter, 30. NPO, NPE and NQ are polling leads which are used to determine when this particular channel unit is to receive and transmit data. NSYNC transmits a sync pulse to tell the CU when a superframe starts.

The counter, 30, determines the time between the sync pulse and the polling pulse (distance count) as illustrated in step 71 and transmits this information to the microcomputer, 21, as illustrated in step 72. Based on the distance count, the microcomputer, 21, determines the address of the channel unit and transmits it to the time slot zero control, 34, along with the valid mode bits for all systems, as illustrated in step 73. When the time slot zero control, 34, receives the PCM signal from the TRU, the control, 34, sends the received mode bits to the microcomputer, 21, on line 36, as illustrated in step 74. The microcomputer includes a look-up table for the various values of distance counts and mode bits which determine the numbers to be transmitted by the microcomputer relating to the placement of the B1, B2 and D channels. As illustrated in step 75, the microcomputer, therefore, determines the placement of the B1, B2 and D channels based on the distance count, which is an indication of the time slot which the customer line occupies, and on the mode bits received from the time slot zero control, 34, which mode bits tell the CU which system it is operating in. For example, if the system is a SLC® 2000 system and the customer line occupies the tenth time slot, the microcomputer determines that the B1 and B2 channels for this customer line belong in the tenth time slot and the D channel belongs in the fourth time slot.

As illustrated in step 76, this placement information is transmitted to the polling control, 31, which stores the information for the CU and also controls interfaces 32 and 33. Interface 32 receives PCM signals from the TRU (14 of FIG. 1) and transmits them to the transceiver (22 of FIG. 5) of the CU. Interface 33 receives PCM signals from the transceiver and transmits them to the TRU. Thus, under the control of the polling control unit, 31, as illustrated in step 77, interface 32 will collect B1, B2 and D channel data from the appropriate time slots for transmission to the customer, and interface 33 will insert B1, B2 and D channel data into the appropriate time slots for transmission to the LDS.

As illustrated in FIG. 8, the time slot zero control, 34, receives the PCM signals and the NSYNC pulses from the TRU (step 80). The time slot zero control, 34, also receives from the microcomputer, via line 35, the channel unit address and valid mode bits of the system, as illustrated in step 81 and previously shown as step 73 in FIG. 7. The control will then examine the time slot zero which includes the address of this particular customer line. The frame will be ignored if either the parity is bad (in this case even) according to step 83, or, as in step 84, the mode bits do not conform to the information received from the microcomputer. If the frame is rejected for those reasons, the control will wait for the next frame including a time slot zero addressed to the CU.

Assuming the parity and mode bits check out, in accordance with step 85, the time slot zero information is transmitted to the microcomputer, 21, on line 36 for appropriate action.

In accordance with step 86, the same control unit will also invert all the time slot zero bits it receives from the TRU, insert the inverted bits into the interface 33 via line 37 and thereby send back the inverted bits to the TRU as an error check. Further, the control, 34, will also examine the mode bits from the appropriate time slot zero. If the bits are not an allowable set of mode bits, the control unit, 34, will effectively shut down the interface 33 via line 38 for the channel corresponding to this time slot zero.

Continuing with the diagram of FIG. 8, at step 87, the time slot zero control, 34, also determines if a valid H bit is present, i.e., has the H bit location in time slot zero changed from 0→1 and remained 1 for two consecutive frames?". If so, according to step 88, the performance monitor, 39 of FIG. 6, will be updated to store the previous hour's line performance data and begin a new hour of monitoring.

If no valid H bit is present or, in any event, following the update of the performance monitor in step 88, a determination is made by the time slot zero control, 34, as to whether the L bit has been set (i.e., equal to "1") according to step 89. If not, the process returns to the initial step 80 for the next frame. If the L bit has been set, according to step 90, the interface device, 20, will instruct the transceiver, 22, to freeze the phase lock loop condition to avoid drifting. The interface device, 20, will then determine if L has been set for two or more consecutive frames and then returned to zero, according to step 91 labeled "valid clock switch?". If not, the process returns to step 80 for the next frame. If so, according to step 92, the interfaces, 32 and 33 of FIG. 6, will calculate the amount of phase variation and adjust the internal timing to compensate for this "jitter."

Figure 9:
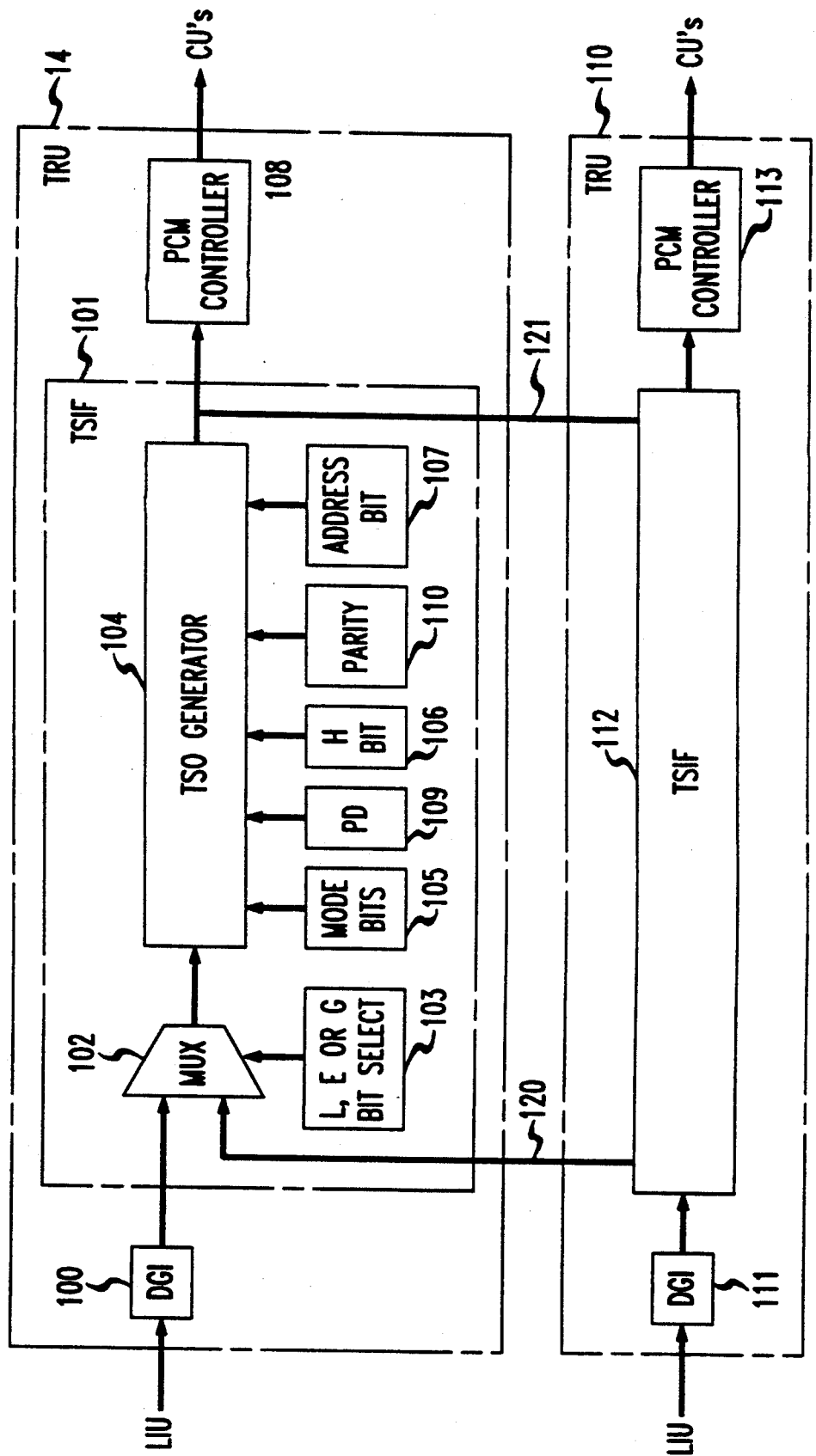
FIG. 9 is a block diagram illustrating portions of a typical transmit-receive unit which can utilize the invention.

FIG. 9 illustrates portions of a typical pair of transmit-receive units, 14 and 110, in a remote terminal (11 of FIG. 1) which are capable of generating a time slot zero in accordance with FIG. 4. Each TRU, 14 and 110, includes a digroup interface (DGI), 100 and 111 respectively, which receives data from corresponding line interface units (e.g., 13 of FIG. 1) and transforms the data rate for compatibility with the channel units. Each TRU also includes a time slot interchange formatter (TSIF), 101 and 112 respectively, for assembling system information data in the appropriate time slots. The two TSIFs are coupled together by data lines 120 and 121 so that data from any LIU can be sent through either TRU. Since the TSIFs of both TRUs are essentially identical, only TSIF 101 of TRU 14 is shown in more detail. (For more information concerning TRUs, including the feature of coupling together TRUs at a remote terminal, see U.S. Patent Application of M. M. Clougherty and S. Warmink, Case 1-1, filed on an even date herewith.)

The data from DGIs 100 and 111 is transmitted to multiplexer, 102, (which is controlled by a bit selector 103) which determines if the L, E or G bit from TRU 14 or from TRU 110 is chosen for transmission at a particular time. (A separate multiplexer would typically be used for each of the L, E and G bits.) The chosen bits and the data are transmitted to a time slot zero generator, 104, which also receives bits from a mode bit generator, 105, an H bit generator, 106, an address bit generator, 107 a PD bit generator, 109, and a parity bit generator, 110. The time slot zero generator will assemble all the bits into time slot zero in accordance with FIG. 4 and transmit the time slot zero, along with the other time slots, to the PCM controller, 108 or 113, which is coupled to the channel units.

Various modifications will become apparent to those skilled in the art. All such variations which basically rely on the teachings through which the invention has advanced the art are properly considered within the scope of the invention.

We claim:

1. In an ISDN loop carrier transmission system which provides three channels per customer line and uses a frame pattern including a plurality of time slots, a method for transmitting data comprising the steps of:
   transmitting the data from two of the channels for a single customer line in a single time slot;
   transmitting information concerning the system in the first time slot in the frame; and
   transmitting the data from the third channel in an otherwise unused additional time slot.

2. The method according to claim 1 wherein the time slots comprise 16 bits.

3. The method according to claim 1 wherein the system information comprises an indication of whether there is an out-of-frame condition and an indication of whether there is a loss of signal in the system.

4. The method according to claim 3 wherein the first time slot further includes a plurality of address bits designating the destination for the system information in that time slot.

5. The method according to claim 4 wherein the first time slot further includes a plurality of bits designating the system in which the data is transmitted.

6. The method according to claim 4 wherein the system comprises a remote terminal including a plurality of channel units, and the data is assembled by the remote terminal into a superframe including a plurality of said frames, the first time slot in each frame of the superframe including a different address for each channel unit.

7. The method according to claim 1 wherein the system information comprises a bit which indicates the start of a performance monitoring period.

8. The method according to claim 1 wherein the system information includes a bit indicating clock drift.

9. Apparatus for transmitting data in an ISDN loop carrier transmission system which provides three channels per customer line and which uses a frame pattern including a plurality of time slots comprising:
   means for placing the data from two of the channels for a single customer line in a single time slot; and
   means for placing the data from the third channel in an otherwise unused additional time slot.

10. Apparatus according to claim 9 wherein the means for placing the data is part of a channel unit.

11. Apparatus according to claim 10 wherein the means for placing the data comprises a counter, a microcomputer and a polling control circuit.

12. Apparatus according to claim 11 further comprising means for transmitting to the microcomputer system information from a time slot which includes an address of the channel unit.

13. Apparatus according to claim 11 further comprising means for extracting mode bits from the first time slot in the frame.

14. Apparatus according to claim 10 further comprising means for inverting bits from an incoming frame and then transmitting said inverted bits to an interface of the channel unit.

15. Apparatus according to claim 13 wherein said means for extracting mode bits also includes means for stopping transmission of a channel from the channel unit if the mode bits are improper.

16. The method according to claim 1 wherein the data from two of the channels completely fills the time slot.

17. Apparatus according to claim 9 wherein the means for placing the data comprises means for completely filling the time slot with the data from two of the channels.

* * * * *